US008856516B2

(12) United States Patent
Rescorla et al.

(10) Patent No.: US 8,856,516 B2
(45) Date of Patent: Oct. 7, 2014

(54) CERTIFICATE REVOCATION

(75) Inventors: Eric Rescorla, Palo Alto, CA (US); Theo Zourzouvillys, Bicester (GB)

(73) Assignee: Skype, Dublin (IE)

( * ) Notice: Subject to any disclaimer, the term of this patent is extended or adjusted under 35 U.S.C. 154(b) by 848 days.

(21) Appl. No.: 12/885,050

(22) Filed: Sep. 17, 2010

(65) Prior Publication Data

US 2012/0072720 A1    Mar. 22, 2012

(51) Int. Cl.
*H04L 29/06* (2006.01)
*H04L 9/00* (2006.01)
*H04L 9/32* (2006.01)

(52) U.S. Cl.
CPC *H04L 9/006* (2013.01); *H04L 9/32* (2013.01); *H04L 9/3268* (2013.01)
USPC ............ 713/158; 713/176; 707/E17.009; 707/683; 707/E17.01; 707/E17.005; 380/255

(58) Field of Classification Search
CPC .......... H04L 9/006; H04L 9/32; H04L 9/3268
USPC .................. 713/158, 176; 707/E17.009, 683, 707/E17.01, E17.005; 380/255
See application file for complete search history.

(56) References Cited

U.S. PATENT DOCUMENTS

| 5,638,448 | A | 6/1997 | Nguyen |
| 6,128,740 | A | 10/2000 | Curry et al. |
| 6,134,551 | A | 10/2000 | Aucsmith |
| 6,304,974 | B1 | 10/2001 | Samar |
| 7,350,074 | B2 | 3/2008 | Gupta et al. |
| 2003/0188156 | A1 | 10/2003 | Yasala et al. |
| 2003/0236976 | A1 | 12/2003 | Wheeler |
| 2004/0264697 | A1 | 12/2004 | Gavrilescu et al. |
| 2007/0118740 | A1 | 5/2007 | Deishi |
| 2007/0234059 | A1* | 10/2007 | Ohara ........................... 713/176 |
| 2008/0126378 | A1* | 5/2008 | Parkinson et al. ............ 707/101 |
| 2010/0106968 | A1 | 4/2010 | Mori |
| 2010/0228701 | A1* | 9/2010 | Harris et al. .................. 707/683 |
| 2012/0072721 | A1 | 3/2012 | Rescorla et al. |

FOREIGN PATENT DOCUMENTS

| WO | WO-2012035095 | 3/2012 |
| WO | WO-2012035096 | 3/2012 |

OTHER PUBLICATIONS

Google Patent search.*
ACM search.*
IEEE search.*
IP.com search.*

(Continued)

*Primary Examiner* — Krista Zele
*Assistant Examiner* — Arvin Eskandarnia
(74) *Attorney, Agent, or Firm* — Sonia Cooper; Jim Ross; Micky Minhas

(57) ABSTRACT

A communication system includes a plurality of nodes, the communication system being arranged to assign each of the plurality of nodes a certificate by means of which it can authenticate itself to other nodes in the communication system and periodically distribute to the plurality of nodes an update formed by compressing a data set representing the validity of the certificates assigned to the plurality of nodes. The update is such that a node may not be able to unambiguously determine from the update whether or not a particular certificate is valid. The system further provides the plurality of nodes with a source of information about the validity of the plurality of certificates that is different from the update and by means of which a node may resolve an ambiguity in the update regarding a particular certificate's validity.

31 Claims, 4 Drawing Sheets

(56) References Cited

OTHER PUBLICATIONS

Jennings, C. et al., "Resource Location and Discovery (RELOAD) Base Protocol," Oct. 27, 2008, Retrieved from internet on Sep. 2, 2011 from: http://tools.ietf.org/html/draft-ietf-p2psip-base-00, 134 pages.

Cooper, D. et al., "Internet X.509 Public Key Infrastructure Certificates and Certificate Revocation List (CRL) Profile," May 2008, Standards Track, RFC 5280, 151 pages.

Myers, M. et al., "X.509 Internet Public Key Infrastructure Online Certificate Status Protocol—OCSP," Jun. 1999, Standards Track, RFC 2560, Retrieved from internet on Aug. 31, 2011 from: http://www.ietf.org/rfc/rfc2560.txt, 22 pages.

"Non-Final Office Action", U.S. Appl. No. 12/885,242, (Oct. 2, 2012), 14 pages.

"Final Office Action", U.S. Appl. No. 12/885,242, (Jun. 24, 2013), 16 pages.

"International Search Report and Written Opinion", Application No. PCT/EP2011/065994, (Dec. 19, 2011), 10 pages.

Notification of Transmittal of the International Search Report and the Written Opinion of the International Searching Authority for Int'l Application No. PCT/EP2011/065995; Date Mailed: Dec. 19, 2011.

"Non-Final Office Action", U.S. Appl. No. 12/885,242, Dec. 11, 2013, 17 pages.

"Notice of Allowance", U.S. Appl. No. 12/885,242, Apr. 23, 2014, 7 pages.

\* cited by examiner

CERTIFICATE REVOCATION

TECHNICAL FIELD

The invention relates to authenticating clients in a communications system and in particular to updating nodes when a certificate for authenticating a client is no longer valid.

BACKGROUND

Many communications systems comprise centralised servers operated by a system provider. A client may obtain services by accessing one of those servers. Typically, the server authenticates the client's identity before providing it with the requested services. For example, the user may be required to enter a user name and password that the server checks against a record of user names and passwords that it stores or has access to. Once the server has authenticated the client, it may provide the services as requested.

Other communication systems are arranged differently. Instead of using only centralised servers that are operated by the system provider, the network may contain a large number of distributed nodes that a client can access to obtain services. These nodes are not necessarily either owned or operated by the system provider. For example, the nodes may be user devices running software from the system provider that enables them to act as nodes in the communication system. This enables a communication system to be created by essentially "borrowing" a small amount of computing resources from millions of devices. A user can then access the system via any one of millions of nodes. In such distributed networks, it is no longer necessary for a client to access a centralised server to obtain services. However, the need to authenticate the client remains One option would be for the client to provide the distributed node with its username and password, which the distributed node can then check with a centralised database. However, it is undesirable for a distributed node to have to contact a centralised database every time it needs to authenticate a client. An alternative option is to assign each client a private/public key pair. The client can authenticate itself with the distributed node by sending the node a message that it has digitally signed with its private key. The distributed node can then authenticate the client by applying the corresponding public key to the message.

Each client is typically issued with a digital certificate. Digital certificates form part of the RELOAD protocol and are described in "Resource Location and Discovery (RELOAD) Base Protocol" by C. Jennings et al. The certificates contain a binding between a username and a public key so that a third party node can be sure that the public key is assigned to that particular client. The certificates may be issued by the central server, which is trusted by the nodes, or by some trusted third party issuer. The issuer signs the certificate with its private key. Because the node trusts the issuer of the certificate, it can be sure that the client's public key is assigned to the client once it has the certificate authenticating that key.

Typically a certificate includes:
The client's public key
The client's username
Expiration date of the certificate
Name of the issuer
Digital signature of the issuer In a large communication system it is not feasible for each node to store certificates for every user in the system. The certificates therefore need to be stored elsewhere in the system, in a location that is accessible by the distributed nodes. One option would be for the certificates to be stored by the central server. However, this would require the nodes to access that central server every time they want to authenticate a client. A preferred option is to store the certificates for a particular client in a particular node. The certificates can then be distributed throughout the nodes of the communication system.

An example of a distributed telecommunications system is shown in FIG. 1. The system, shown generally at 101, comprises a plurality of nodes, shown generally at 102. The system is pictured as a "ring" structure in which in each position in the ring is allocated a number. In the example shown in FIG. 1, the ring has 22 such positions. In reality, however, the number of positions may number many millions. Each position may be taken by a node, 102, with some positions remaining empty. A node that follows one or more empty positions will assume responsibility for the empty positions immediately preceding its own (e.g. the node 107 at position 20 in FIG. 1 also takes responsibility for positions 18 and 19, as illustrated at 103).

A certificate associated with a particular client may be stored in one of the nodes. In FIG. 1 the certificate authenticating the public key of client 104 is stored in node 106. Typically the identity of the nodes that will store a certificate associated with one particular user will be determined by a central server, which can then 'push' the certificates out to the appropriate nodes. A node that wants to authenticate a particular client can request that client's certificate from the node that stores it.

One way of storing data in a communication system comprising a large number of distributed nodes is by using a distributed hash table (DHT). A DHT provides a service similar to a hash table by storing key/value pairs so that any participating node can retrieve the value associated with a given key. A DHT may distribute responsibility for maintaining current mappings of keys to values among the nodes of a communication system so that a change in the participant nodes causes a minimal amount of disruption.

In order minimise the amount of data that nodes in the system are required to store for other nodes, any given node may only allowed to store data at a small number of locations within the overlay. For example, the RELOAD protocol provides access controls that permit a given key to be writable only by a small number of nodes. The locations to which a node is permitted to write may be determined by its certificate. The node may also be required to sign each value to be stored with its private key to authenticate its right to store at that location. Signing the value to be stored also serves to protect the stored data from tampering. It is therefore important to inform nodes in the overlay when a certificate is invalid to not only control access to the system but also to protect data stored within the system from rogue nodes.

One issue is how to revoke certificates before their expiration date. For example, if a user whose laptop is stolen will want to revoke that laptop's entitlement to access the communication system. In a communication system that may comprise many millions of nodes, this is not necessarily straightforward. One option is for a central server to push information regarding the revocation of certificates out to all of the nodes in the network. An example of this is the certificate revocation lists that are described in "Internet X.509 Public Key Infrastructure Certificate and Certificate Revocation List (CRL) Profile" by D. Cooper et al. However, if these messages are generated too frequently they can negatively impact the performance of the system. Conversely, if they are not generated frequently enough to provide the nodes with timely updates on certificate revocations, this leaves open the possibility that a client may be provided with services it is no longer entitled to because the node that provides that service has not been informed that the certificate has been revoked. Another option is to update nodes on certificate status by using online status checks, as described in "X.509 Internet Public Key Infrastructure Online Certificate Status Protocol—OCSP" by M. Myers et al. However, this requires nodes to contact a centralised OSCP responder (which may be the Certificate Authority) to check the current status of a certificate. This option therefore also suffers from a performance/timeliness trade-off whereby nodes seeking to obtain up-to-date certificate information can negatively impact system performance by bombarding a central node with status requests.

A further issue arises due to the way certificates are stored. In RELOAD, certificates are issued by a central authority and are then stored at a given location in the overlay (as described above). This location is writable by the owner of the certificate and hence is not secure from attack by compromised nodes.

Therefore, there is a need for an improved way of distributing certificate revocation information throughout a communications system.

SUMMARY

According to a first embodiment of the invention, there is provided a communication system comprising a plurality of nodes, the communication system being arranged to assign each of the plurality of nodes a certificate by means of which it can authenticate itself to other nodes in the communication system, periodically distribute to the plurality of nodes an update formed by compressing a data set representing the validity of the certificates assigned to the plurality of nodes, the update being such that a node may not be able to unambiguously determine from the update whether or not a particular certificate is valid and provide the plurality of nodes with a source of information about the validity of the plurality of certificates that is different from the update and by means of which a node may resolve an ambiguity in the update regarding a particular certificate's validity.

The communication system may be arranged to generate the update by forming the data set so that it identifies which of the certificates are valid and which of the certificates are invalid.

The communication system may be arranged to form the data set to be a bitmap comprising a number of entries at least as great as the number of certificates assigned to the plurality of nodes or to be a bitmap comprising a number of entries fewer than the number of certificates assigned to the plurality of nodes.

The communication system may be arranged to generate the update by applying a lossy compression algorithm to the data set.

The communication system may be arranged to generate the update by applying a Bloom filter to the data set.

The communication system may be arranged to store an indicator of a certificate's revocation as the source of information regarding the validity of the plurality of certificates that is different from the periodic update.

The communication system may be arranged to store the indicator at a location in the communication system to which a node assigned the revoked certificate is not permitted to write.

The communication system may comprise an authentication node arranged to determine that a certificate should be revoked and to, responsive to that determination, write an indicator of that certificate's revocation to a location that is external to the authentication node and to which the node assigned the revoked certificate is not permitted to write.

The communication system comprises a storage node arranged to store the source of information regarding the validity of the plurality of certificates that is different from the periodic update.

The storage node may be arranged to store the indicator.

The storage node may be arranged to not permit a node that is assigned the revoked certificate to write to the location in which the indicator is stored.

The storage node may be arranged to permit only the authentication node to write to the location in which the indicator is stored.

One or more of the plurality of nodes may be arranged to, when it cannot unambiguously determine from the update whether or not a particular node is valid, obtain an indicator corresponding to that particular certificate and determine from the indicator whether or not the particular certificate is valid.

The authentication node may be arranged to, responsive to the determination that the certificate should be revoked, assign a new certificate to the node that is assigned the revoked certificate.

The indicator may identify a certificate that is the valid certificate most recently assigned to the node assigned the revoked certificate. The indicator may comprise a serial number associated with the valid certificate most recently assigned to the node assigned the revoked certificate.

One or more of the plurality of nodes may be arranged to request that the storage node update it whenever the indicator changes.

The storage node may be arranged to, when the indicator changes, transmit an indication of that change to the node that requested the update.

The storage node may be arranged to, when the indicator changes, transmit the new indicator to the node that requested the update.

The authentication node is arranged to write the indicator to more than one node.

Each of the nodes storing the indicator may be arranged not to permit a node that is assigned the revoked certificate to write to the location in which the indicator is stored.

According to a second embodiment of the invention, there is provided a node for operating in a communication system comprising a plurality of nodes, in which each node is assigned a certificate by means of which it can authenticate itself to other nodes in the communication system, the node being arranged to receive an update indicating the validity of the certificates assigned to the plurality of nodes, determine that it cannot unambiguously conclude from the update whether or not a particular certificate is valid and responsive to that determination, access a source of information about the validity of the plurality of certificates that is different from the update and resolve the ambiguity regarding the particular certificate's validity by means of that information.

The communication system may be arranged such that, when a certificate is revoked, an indicator of that revocation is stored in one of the plurality of nodes, the node being arranged to resolve the ambiguity regarding the particular certificate's validity by obtaining an indicator associated with that certificate and determining in dependence on that indicator whether or not the particular certificate is valid.

The communication system may be arranged such that an indicator of a certificate's revocation identifies a certificate that is the valid certificate most recently assigned to the node assigned the revoked certificate, the node being arranged to authenticate another node if an indicator associated with the other node's certificate identifies that certificate as being the valid certificate most recently assigned to the other node.

The node is arranged to request that a node storing an indicator associated with a particular certificate update it whenever the indicator changes.

According to a third embodiment of the invention, there is provided an authentication node for operating in a communication system comprising a plurality of nodes, in which each node is assigned a certificate by means of which it can authenticate itself to other nodes in the communication system, the authentication node being arranged to periodically distribute to the plurality of nodes an update formed by compressing a data set representing the validity of the certificates assigned to the plurality of nodes, the update being such that a node may not be able to unambiguously determine from the update whether or not a particular certificate is valid, and cause a source of information about the validity of the plurality of certificates that is different from the update and by means of which a node may resolve an ambiguity in the update regarding a particular certificate's validity to be stored by communication system.

The authentication node may be arranged to generate the update by forming the data set so that it identifies which of the certificates are valid and which of the certificates are invalid.

The authentication node may be arranged to form the data set to be a bitmap comprising a number of entries at least as great as the number of certificates assigned to the plurality of nodes.

The authentication node may be arranged to generate the update to be a bitmap comprising a number of entries fewer than the number of certificates assigned to the plurality of nodes.

The authentication node may be arranged to generate the update by applying a lossy compression algorithm to the data set.

The communication system may be arranged to generate the update by applying a Bloom filter to the data set.

The authentication node may arranged to determine that a certificate should be revoked and to, responsive to that determination, write an indicator of that certificate's revocation to one of the plurality of nodes as the source of information about the validity of the plurality of certificates.

The authentication node may be arranged to write the indicator to a location in said one of the plurality of nodes to which the node assigned the revoked certificate is not permitted to write.

The authentication node may be arranged to, responsive to the determination that the certificate should be revoked, assign a new certificate to the node that is assigned the revoked certificate.

The authentication node may be arranged to form the indicator to identify a certificate that is the valid certificate most recently assigned to the node assigned the revoked certificate.

The authentication node may be arranged to form the indicator to comprise a serial number associated with the valid certificate most recently assigned to the node assigned the revoked certificate.

The authentication node may be arranged to write the indicator to more than one node.

According to a fourth embodiment of the invention, there is provided a non-transitory computer-readable medium encoded with instructions, that when executed by a node for operating in a communication system comprising a plurality of nodes, in which each node is assigned a certificate by means of which it can authenticate itself to other nodes in the communication system, cause the node to receive an update indicating the validity of the certificates assigned to the plurality of nodes, determine that it cannot unambiguously conclude from the update whether or not a particular certificate is valid and responsive to that determination, access a source of information about the validity of the plurality of certificates that is different from the update and resolve the ambiguity regarding the particular certificate's validity by means of that information.

According to a fifth embodiment of the invention, there is provided a non-transitory computer-readable medium encoded with instructions, that when executed by an authentication node for operating in a communication system comprising a plurality of nodes, in which each node is assigned a certificate by means of which it can authenticate itself to other nodes in the communication system, cause the authentication node to periodically distribute to the plurality of nodes an update formed by compressing a data set representing the validity of the certificates assigned to the plurality of nodes, the update being such that a node may not be able to unambiguously determine from the update whether or not a particular certificate is valid and cause a source of information about the validity of the plurality of certificates that is different from the update and by means of which a node may resolve an ambiguity in the update regarding a particular certificate's validity to be stored by communication system.

BRIEF DESCRIPTION OF THE DRAWINGS

For a better understanding of the present invention, reference is made by way of example to the following drawings, in which.

DETAILED DESCRIPTION

Figure 1:
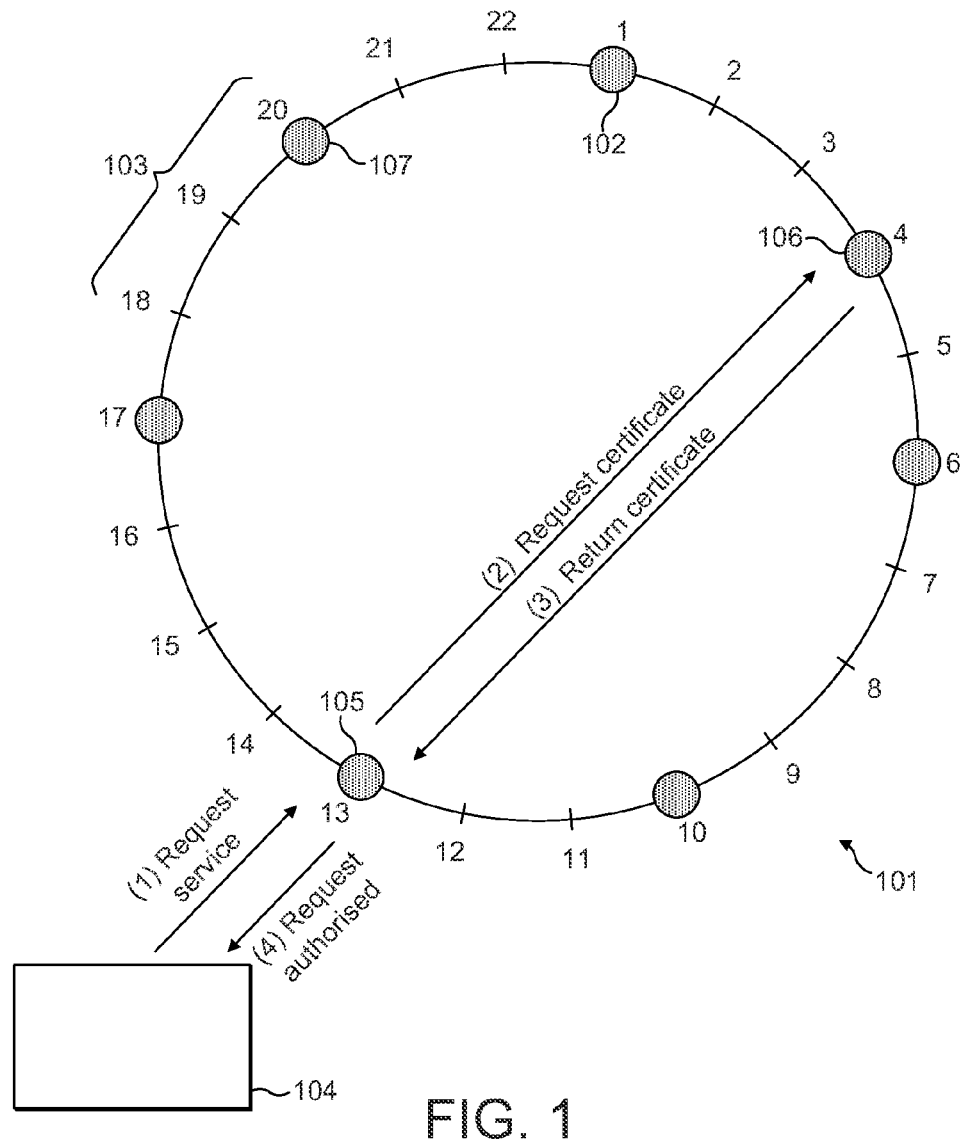
FIG. 1 shows a distributed communication system.

A communication system comprising a plurality of nodes may be arranged to assign each node a certificate by means of which it can authenticate itself to other nodes in the communication system. In order to keep the plurality of nodes updated on which certificates have been revoked and are now invalid, the communication system may periodically distribute an update indicating the validity of the certificates to the nodes.

As the update has the potential to be extremely large, it is preferably formed by compressing a data set representing the validity of the certificates assigned to the plurality of nodes. The resulting update may not include enough information for a node to be able to unambiguously determine from the update alone whether or not a particular certificate is valid. Therefore, the communication system preferably also provides the plurality of nodes with a back-up source of information about the validity of the plurality of certificates that they can use to resolve any ambiguity in the update regarding a particular certificate's validity.

The communications system may be arranged as a distributed network comprising a plurality of nodes. Each of the nodes may be capable of providing services to other nodes in the system so that a client can effectively access the network by accessing any of the plurality of nodes. Each node is preferably arranged to authenticate the other node before allowing it to access a service.

The nodes may be any device capable of operating in the communication system, e.g. a server, a PC, a laptop computer, a mobile phone or a PDA. Software for programming the devices to operate as nodes in the communication system may be provided by the system provider. Client devices may be programmed not only to function as client nodes in the system but also as nodes that function as part of the system itself, e.g. as relay nodes.

Many communication systems operate not on the basis of identifying and authenticating actual machines within the system but of identifying and authenticating user accounts registered with the system provider. Therefore, certificates may also be assigned to a user account. Certificates might be assigned to an instance of client software running under a particular user account. Certificates might also be assigned to software that is provided by an external software developer so that an application implemented by externally-provided software can authenticate itself as being a valid application by forwarding its certificate to the other nodes. In each circumstance, the certificate relates to a particular instance of a node, whether that instance relates to the node itself or the node operating under a particular user account or running a particular application and so the certificate can still be considered as being assigned to that node. In some instances, multiple nodes may share a certificate. In these circumstances, the certificate may be considered as being assigned to each of those nodes.

Each certificate suitably includes an expiration date after which it is invalid. However, in some situations the communication system may determine that a certificate should be revoked before its expiration date. Examples of such situations include:
- A subscriber whose mobile phone or laptop has been stolen contacting the system operator to ask that the stolen device be blocked from accessing the network.
- A subscriber wanting to change their username, password or other security details.
- A decision based on an internal determination by the system. For example, a client on a 'pay-as-you-go' tariff may be blocked when their prepaid balance has been decremented to zero or a user behaving inappropriately on the system may be blocked by system moderators.
- An external developer has developed software that is being used in the communication system and that contains a bug. In this scenario, the communication system may want to effectively block that software from the system. This may be achieved by revoking the certificates assigned to all nodes using that software. Alternatively, if the system also assigns certificates to applications, the system may simply revoke all of the certificates assigned to the application that has the bug.

The difficulty with revoking certificates before their expiration date is how to inform all of the nodes in the distributed communication system that a particular certificate is no longer valid. This issue may be addressed by having the CA (which issues the certificates) publish an indicator of the latest valid certificate for a given user in the overlay. This indicator may be stored by a subset of one or more nodes. A node that wishes to verify a certificate's validity may request the indicator from the subset of nodes. The node can then determine from the indicator whether or not a particular certificate is actually valid. The node may then authenticate the node to which the certificate is assigned in dependence on its validity.

The indicator is suitably stored by each node in the subset at a location that is external to the CA and writable by the CA but not by the node assigned the certificate. This prevents a compromised node from overwriting the indicator in order to make a revoked certificate appear valid.

Figure 2:
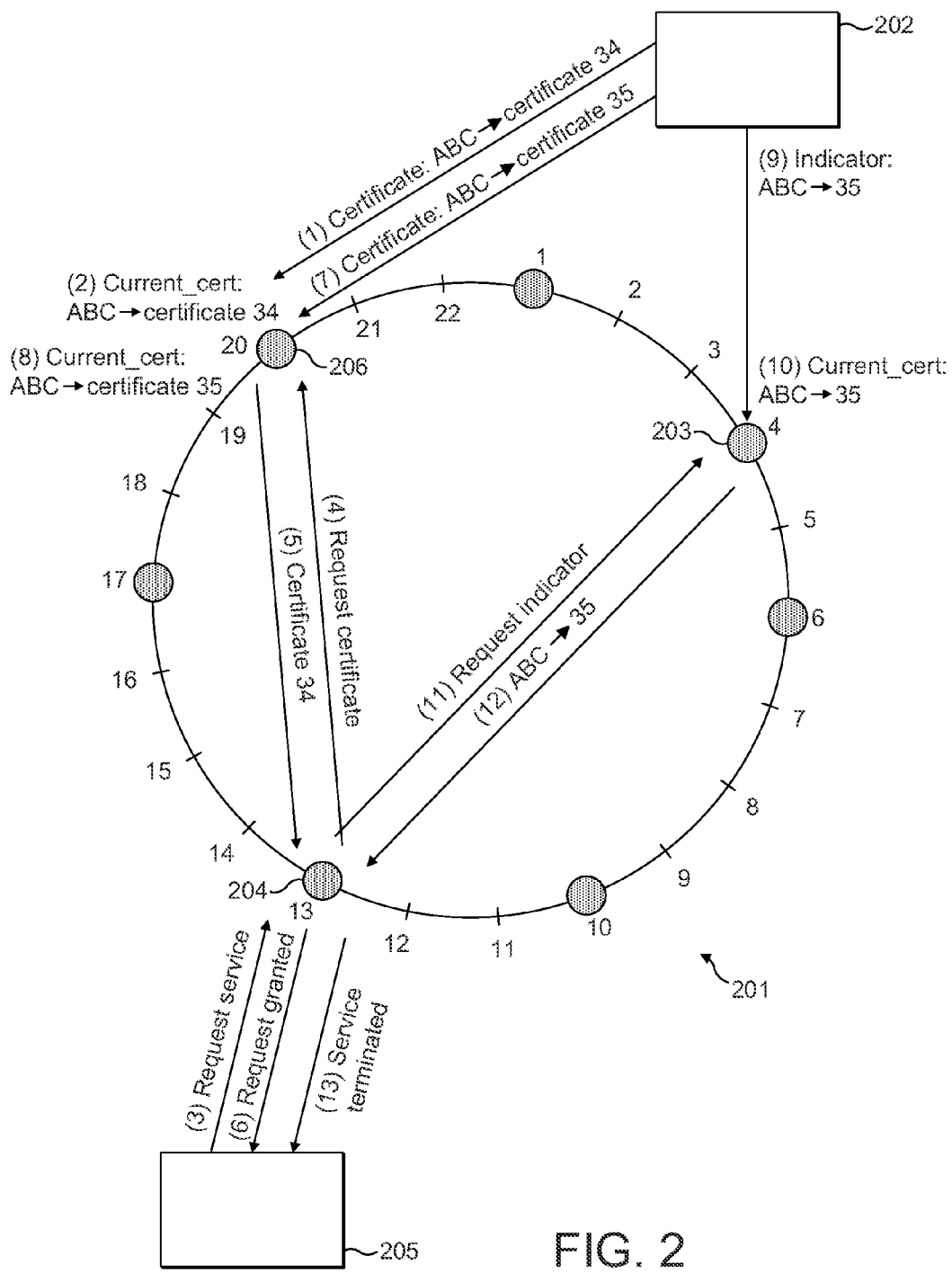
FIG. 2 shows a communication system in accordance with an embodiment of the invention.

An example of a communication system that utilises a distinct revocation data store is shown in FIG. 2. The communication system comprises a plurality of nodes that together form the overlay of a distributed communications system, shown generally at 201. In a similar arrangement to that shown in FIG. 1, the system is illustrated as a "ring" structure in which each position in the ring is allocated a number. As before, a node following one or more empty positions will assume responsibility for the empty positions immediately preceding its own.

The communication system also comprises a CA 202, which is responsible for issuing and revoking certificates, and two storage nodes 203, 206 for storing status data and certificates respectively. The locations of the storage nodes may be determined by applying a hash function or other mathematical function to a username associated with the certificate to obtain the position within the system at which the certificate and certificate status should be stored. Preferably, the storage nodes are not nodes that are assigned the certificate in question. Operation of the communication system shown in FIG. 2 will now be described with reference to an example sequence of events shown in the figure.

First, the CA issues a new certificate in respect of username ABC. That certificate is stored by node 206 (see steps 1 and 2). This certificate has the serial number 34. A client node 205 then requests a service from node 204 (step 3) under username ABC. Node 204 requests the certificate assigned to username ABC from node 206 (step 4) and when it is returned (step 5), it uses that certificate to authenticate node 205. Node 204 then grants node 205 the requested service (step 6). However, in the meantime CA has determined that certificate 34 assigned to username ABC should be revoked. It issues a new certificate, with serial number 35 and forwards it to node 206 (step 7) for storing as the current certificate assigned to username ABC. A problem is that node 204 is unaware of the revocation of certificate 34 and will thus continue to provide node 205 with services to which it may no longer be entitled until the expiry of certificate 34.

In order to address this problem, the CA stores an indicator of certificate 34's revocation in node 203 by sending the indicator to node 203. The indicator could be a number of values, for instance a serial number or a digest of the certificate. In this example, the CA sends the serial number of the current valid certificate assigned to username ABC (step 9) which node 203 then stores (step 10).

Suitably the indicator of a certificate's revocation is stored in a location to which the node assigned the revoked certificate is not permitted to write. So, for instance, the CA might write indicator 35 to location current_cert:ABC in node 203 and put in place an access control rule that this location is writable only by the CA.

If node 204 wishes to confirm that certificate 34 is still valid, it may contact node 203 for the current indicator corresponding to that certificate (step 11). Node 203 returns indicator "35" (step 12), which does not correspond to the serial number (34) of the certificate that node 204 accepted as authenticating client node 205. Node 204 may deduce from this that certificate 34 has been revoked and withdraw services from node 205 accordingly (step 13).

An issue with having an indicator of a certificate's location stored in the overlay is that nodes must periodically poll the storing node if they are to obtain timely information on certificate revocations. This can be expensive in terms of bandwidth. The performance/timeliness trade-off can be improved by introducing a publish/subscribe mechanism. Such mechanisms are described generally in "Session Initiation Protocol (SIP)—Specific Event Notification" by A. Roach et al. This general concept has been developed to relate to certificate revocation data, so that any of the plurality of nodes in the system may subscribe to certificate updates from a storage node. Typically the relying party would subscribe to the location containing certificate status and when that data stored at that location changes, the storage node sends an update to the relying node. The update may comprise the new indicator or simply an indication that the data stored at the subscribed location has changed. The relying node may treat any indication of a change as meaning that the certificate in question has been invalidated.

If an attacker gains control of the node which happens to store the status information (this is more likely when a small DHT is used to store status information), then they can simply fail to update subscriber nodes about a certificate's revocation or they can lie about the current state of the status data. An example might be where subscriber A's laptop has been stolen and the theft has been reported to the system operator. The operator will then revoke the laptop's certificates to block it from the system. However, the attempt to block the laptop might be ineffective if the thief, subscriber B, happens to own the node storing revocation data for the laptop's certificate. Subscriber B may stop the node from sending updates relating to the laptop certificate's revocation. Subscriber B might also control the node to send messages indicating that the laptop's revoked certificate is in fact still valid. There are two defences against this form of attack.

One defence is to store the revocation information in multiple (redundant) locations. This means that the attacker would have to subvert more than one node in order to control all of the status data relating to a particular certificate. The more locations in which the status data is stored, the more difficult it is for a potential attacker to gain control of all of the status data. However, the above system may still be compromised. It is possible, if unlikely, that an attacker may manage to control all of the status locations. In addition, any node relying on a particular certificate will have to subscribe to updates from all of the locations storing status data relating to that certificate.

A second defence is for the communication system to publish periodic summaries of all the certificate status information it has generated. These summaries might suitably be generated by the CA. The summary serves as a check on storing nodes which have been compromised. Preferably the summary is not sent too frequently. A daily update should be sufficient to keep a check on any compromised nodes.

The summary would suitably comprise an indication of the validity of each certificate in the system. If the communication system is large, this may number many millions of certificates. Therefore, in order to avoid the summary message becoming unfeasibly large, it preferably has a compressed format.

One way of generating the summary is to form a data set identifying which certificates are valid and which are invalid. The data set might be, for example, a bitmap in which a "one" represents an invalid certificate and a "zero" represents a valid certificate. The bitmap preferably includes an entry for each certificate in the system. The summary message might then be generated by applying a compression algorithm to the bitmap so that the summary message actually contains fewer entries than the number of certificates in the communication system. Each entry in the summary message may therefore relate to more than one certificate.

The compression algorithm is suitably a lossy compression algorithm to keep the size of the summary message to a minimum. This has the disadvantage that some information is lost duration the compression. It will therefore not necessarily be possible for a node to unambiguously determine from the summary whether or not a particular certificate is valid. Instead, each entry in the summary may be indicative only of a likelihood that a particular certificate is valid. The node can, however, resolve any ambiguities in the summary by double-checking summary entries against the status data stored elsewhere in the system.

An example of a suitable compression algorithm for generating the summary is a Bloom filter. A Bloom filter produces highly compressed data sets but has a non-zero false positive rate. In other words, a certificate having a "one" entry in the summary (i.e. as being revoked) might not actually be revoked. Any node using the summary to confirm a certificate's validity is therefore preferably arranged to double-check with the certificate status information stored elsewhere in the system that a certificate indicated as being invalid really has been revoked.

The CA may be arranged to digitally sign the summary using its private key so that the recipient nodes can verify the source of the summary.

Figure 3:
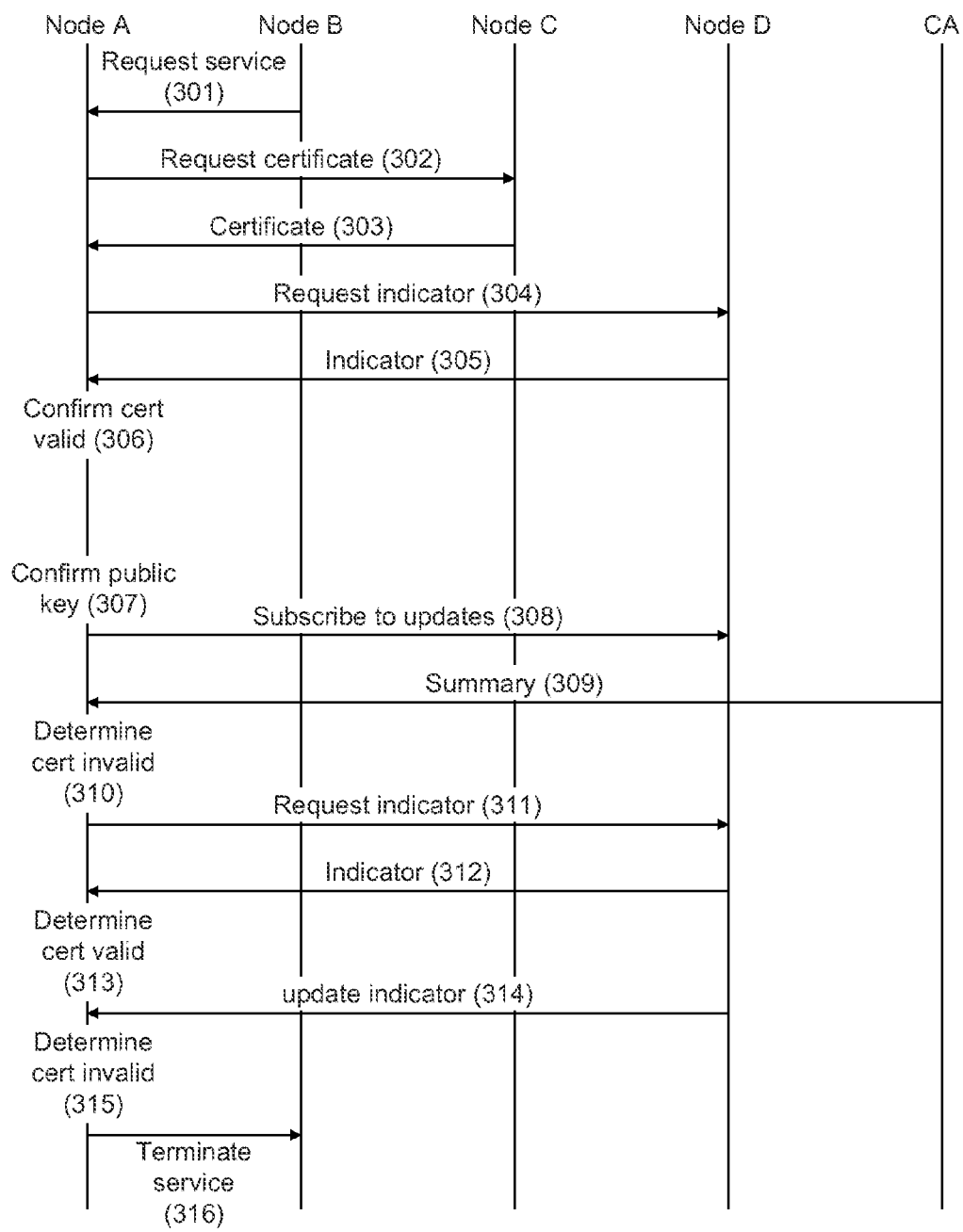
FIG. 3 shows a sequence of events that may be followed by a node wishing to authenticate another node in the communication system.

FIG. 3 illustrates an example sequence of events. In step 301 node B requests a service from node A. Node B digitally signs the request with its private key. Node A authenticates node B by applying the corresponding public key to the request. As part of the authentication process, node A needs to confirm that the public key is both valid and assigned to node B. Node A therefore requests node B's certificate from node C, which stores it (step 302). Node C returns the certificate (step 303). Node A then requests the corresponding indicator of the certificate's validity from node D, which is responsible for storing it (step 304). Node D returns the indicator (step 305) and node A confirms that the certificate is valid (step 306) and authenticates node B using its public key (step 307). Node A then subscribes to status updates from node D so that it will be informed whenever the status of the certificate changes (step 308). Node A then receives a summary update from the CA (step 309), which indicates that the certificate has been revoked (step 310). Node A double-checks this information by requesting the indicator from node D (step 311). Node D returns the indicator (step 312) and node A confirms that the certificate is indeed valid (step 313). However, node A then receives an update from node D indicating that the indicator has changed (step 314), from which node A determines that the certificate is now invalid (step 315). Node A therefore terminates the service it is providing to node B (step 316).

If a node has one or more certificates revoked, it may be required to re-authenticate itself to a central server of the communication system in order to regain access to the system. If the re-authentication procedure is successful, the node may again be allocated one or more certificates by means of which it can authenticate itself to any of the distributed nodes.

Figure 4:
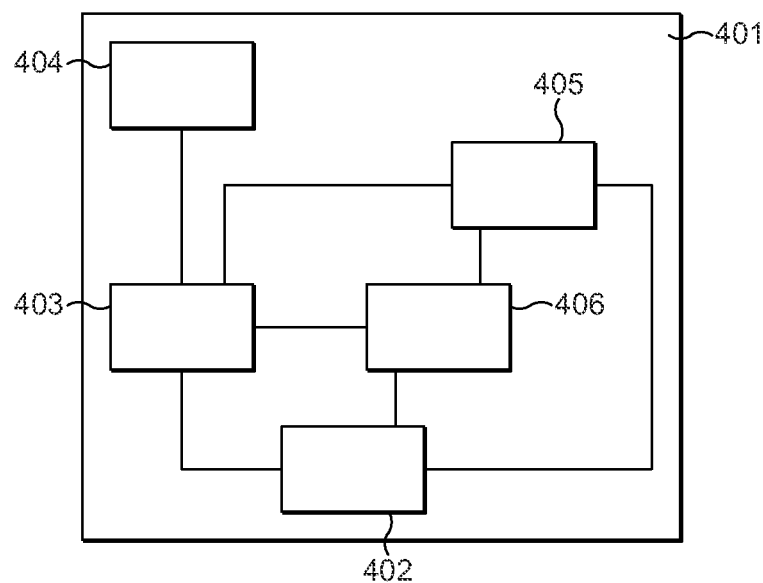
FIG. 4 shows an authentication node in accordance with an embodiment of the invention.

An example of an authentication node that may be used to implement the invention is shown in FIG. 4. The server 401 comprises a communication unit 402, an identification unit 403, an authentication data generation unit 404 and a revocation unit 405. The identification unit 403 may identify the subset of nodes that are to be used to store authentication data associated with a particular client. The authentication data generation unit 404 may generate this data, which may be e.g. a certificate comprising the public key of the client and signed using a private key of the server. This authentication data may then be passed to the identification unit 403. The identification unit may identify the subset of nodes that will be used to store the certificate and certificate status information, for example, by applying a mathematical function such as a hash function to the username associated with the certificate. The certificate may then be passed to the communication unit 402 so that it can be sent to a subset of one or more nodes that will store the certificate. The authentication unit may also generate corresponding status data each time that it generates a new certificate and write it to one or more locations in the communication system. Such status data may be e.g. the serial number of the new certificate or a digest of the new certificate.

The revocation unit 404 may be arranged to identify users, devices or applications that should be blocked from the communication system. The identification unit 403 may determine the subset of nodes that is storing certificates and associated status data assigned to those users, devices or applications. The revocation unit 403 may then instruct the communication unit 402 to send updated status information to those nodes. The authentication unit may be arranged to assign a new certificate after an existing certificate is revoked, in which case that certificate will be transmitted by the authentication node to the appropriate storage nodes.

The server may also comprise an update unit 406 for compiling summaries of certificate status to send to all nodes at predetermined intervals. The update unit 406 may obtain this information from revocation unit 405. The summary messages may just include the status changes that have occurred since the previous update or may include information indicative of the status of all certificates in the system (such as the compressed summaries described above). These summaries may be passed by the update unit 406 to communication unit 402 for transmission to the appropriate nodes.

Figure 5:
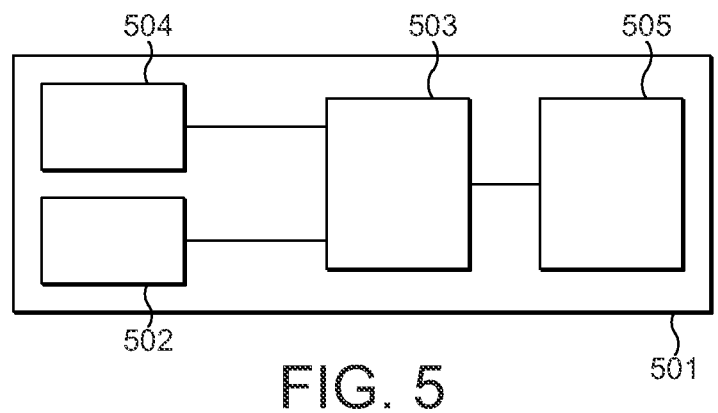
FIG. 5 shows a storage node in accordance with an embodiment of the invention.

An example of a node that may be used to implement features of the invention is shown in FIG. 5. The node 501 comprises a communication unit 502 for receiving requests for services from clients. These requests may be processed by authentication unit 503. The authentication unit may pass the appropriate username to identification unit 504 to identify the one or more nodes that are storing the certificate and certificate status information for the node requesting the service. The storage nodes may be identified by applying a mathematical function such as a hash function to the username. The authentication unit may be arranged to instruct the communication unit to send the appropriate request messages to the identified storage nodes in order to obtain the required certificate and status indicator.

The authentication unit may also be arranged to cause the communication unit to send subscribe requests to the storage units so that the node is updated whenever an indicator changes. The authentication unit may be arranged to determine that a certificate is invalid if it receives an update from the storage node indicating that that certificate's status has changed. As before, the relevant messages may be sent and received by communication unit 502.

The authentication unit may also be arranged to determine from a summary received from a server of the communication system whether or not a particular certificate is valid. If the authentication unit is not able to unambiguously answer this question from the summary alone, it is arranged to send out a request for status information via the identification unit and the communication unit in a similar way to that described above. The authentication unit is arranged to resolve any validity ambiguity using the returned status updates.

If at any time the status information provided by multiple storage nodes is contradictory, the authentication unit is preferably arranged to determine that the certificate is invalid.

The node may also comprise a memory 505 for storing authentication data if node 501 is selected by a server as being one of a subset of nodes used to store either certificates or status data relating to certificates. If the node is selected to store status data, the memory is preferably arranged to implement an access control rule so that only the authentication node is permitted to write to the memory location in which the status data is stored.

Both the server shown in FIG. 4 and the node shown in FIG. 5 are shown illustratively as comprising a number of interconnected functional blocks. In practice these functional blocks are likely to be implemented in software, although they may also be implemented wholly or in part in hardware. In a preferred embodiment of the invention, the node is arranged to operate in accordance with the invention by means of software provided by the network operator.

Embodiments of the invention may therefore take advantage of a distributed communication system to share the responsibility for authorising clients amongst a large number of nodes. This reduces the load on the system-operated servers and has the potential to speed-up access to services of the communication system. Having certificates distributed throughout the system does however raise the issue of how the nodes should be updated when a certificate is revoked. Embodiments of the invention address this issue in a number of ways: publishing certificate status data, storing status data in a plurality of nodes and periodically publishing status summaries. These features work together to make it difficult for a rogue node to subvert the certificate system.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

While this invention has been particularly shown and described with references to example embodiments thereof, it will be understood by those skilled in the art that various changes in form and details may be made therein without departing from the scope of the invention encompassed by the appended claims.

What is claimed is:

1. A communication system comprising
a plurality of nodes and an authentication node, the plurality of nodes communicatively coupled to each other and to the authentication node, the communication system configured to perform operations comprising:
assigning, by the authentication node, a certificate to a node of the plurality of nodes, usable by the node to authenticate the node to other nodes in the communication system;
compressing, by the authentication node, a data set representing validity of certificates assigned to the plurality of nodes to form an update to distribute to the plurality of nodes, the update being such that the update may not unambiguously provide a determination that a particular certificate is valid;
periodically distributing the update to the plurality of nodes, effective to enable the nodes to store the update;
generating, at the authentication node, a source of information about the validity of the plurality of certificates that is different from the update, effective to enable resolution of an ambiguity in the update regarding the validity of the particular certificate;
transmitting the source of information from the authentication node to one or more nodes of the plurality of nodes, effective to enable the source of information to be stored in the one or more nodes;
determining that a specific certificate should be revoked; and
responsive to the determining, the authentication node writing an indicator of the revocation of the specific certificate to one or more of the plurality of nodes as the source of information about the validity of the specific certificate.

2. A communication system as claimed in claim 1, wherein the data set in the update identifies which of the certificates are valid and which of the certificates are invalid.

3. A communication system as claimed in claim 1, wherein the data set is a bitmap comprising a number of entries at least as great as the number of certificates assigned to the plurality of nodes.

4. A communication system as claimed in claim 3, wherein the storage node is configured to permit only the authentication node to write to the location in which the indicator is stored.

5. A communication system as claimed in claim 1, wherein the data set is a bitmap comprising a number of entries fewer than the number of certificates assigned to the plurality of nodes.

6. A communication system as claimed in claim 1, wherein a lossy compression algorithm is applied to the data set.

7. A communication system as claimed in claim 1, wherein a Bloom filter is applied to the data set.

8. A communication system as claimed in claim 1, further comprising a storage node configured to implement storing the source of information regarding the validity of the plurality of certificates that is different from the periodic update.

9. A communication system as claimed in claim 8, wherein the storage node is configured to implement storing the indicator of the certificate revocation as the source of information.

10. A communication system as claimed in claim 9, wherein the storage node is configured to not permit a node that is assigned the revoked certificate to write to the location in which the indicator is stored.

11. A communication system as claimed in claim 9, wherein one or more of the plurality of nodes is arranged to request that the storage node update the one or more of the plurality of nodes whenever the indicator changes.

12. A communication system as claimed in claim 11, wherein the storage node is configured to implement, when the indicator changes, transmitting an indication of that change to the one or more nodes that requested the update.

13. A communication system as claimed in claim 11, wherein the storage node is configured to implement, when the indicator changes, transmitting the new indicator to the one or more nodes that requested the update.

14. A communication system as claimed in claim 1, wherein one or more of the plurality of nodes is configured to implement, when it cannot unambiguously determine from the update whether or not a particular node is valid, obtaining the indicator corresponding to that particular certificate and determining from the indicator whether or not the particular certificate is valid.

15. A communication system as claimed in claim 1, wherein the authentication node further configured to implement:
responsive to the determining that the certificate should be revoked, assigning a new certificate to the node that is assigned the revoked certificate.

16. A communication system as claimed in claim 1, wherein the indicator identifies a certificate that is the valid certificate most recently assigned to the node assigned the revoked certificate.

17. A communication system as claimed in claim 16, wherein the indicator comprises a serial number associated with the valid certificate most recently assigned to the node assigned the revoked certificate.

18. A communication system as claimed in claim 1, wherein the authentication node is configured to implement writing the indicator to more than one node.

19. A communication system as claimed in claim 18, wherein each of the nodes storing the indicator is configured not to permit a node that is assigned the revoked certificate to write to the location in which the indicator is stored.

20. An authentication node configured to operate in a communication system comprising a plurality of nodes that are communicatively coupled to each other and the authentication node, the authentication node being configured to implement operations comprising:
assigning a certificate to a node of the plurality of nodes, effective to enable authentication of the node to other nodes of the plurality of nodes;
compressing a data set representing validity of the certificates assigned to the plurality of nodes to form an update to distribute to the plurality of nodes, the update being such that the update may not unambiguously provide a determination that a particular certificate is valid;
periodically distributing the update to the plurality of nodes, effective to enable storing the update in the plurality of nodes;
generating a source of information about the validity of the plurality of certificates that is different from the update, effective to enable resolution of an ambiguity in the update regarding the validity of the particular certificate;

transmitting the source of information to one or more nodes of the plurality of nodes, effective to enable the source of information to be stored in the one or more nodes;

determining that a specific certificate should be revoked; and responsive to the determining, writing an indicator of the revocation of the specific certificate to one or more of the plurality of nodes as the source of information about the validity of the specific certificate.

21. An authentication node as claimed in claim 20, wherein the data set of the update identifies which of the certificates are valid and which of the certificates are invalid.

22. An authentication node as claimed in claim 20, wherein the data set is a bitmap comprising a number of entries at least as great as the number of certificates assigned to the plurality of nodes.

23. An authentication node as claimed in claim 20, wherein the update is a bitmap comprising a number of entries fewer than the number of certificates assigned to the plurality of nodes.

24. An authentication node as claimed in claim 20, wherein a lossy compression algorithm is applied to the data set.

25. An authentication node as claimed in claim 20, wherein a Bloom filter is applied to the data set.

26. An authentication node as claimed in claim 20, wherein the authentication node is configured to implement writing the indicator to a location in said one of the plurality of nodes to which the node assigned the revoked certificate is not permitted to write.

27. An authentication node as claimed in claim 20, the authentication node further configured to implement:

responsive to the determinating that the specific certificate should be revoked, assigning a new certificate to the node that is assigned the specific certificate.

28. An authentication node as claimed in claim 20, wherein the authentication node is further configured to implement forming the indicator to identify a certificate that is the valid certificate most recently assigned to the node assigned the revoked certificate.

29. An authentication node as claimed in claim 20, wherein the authentication node is further configured to implement forming the indicator to comprise a serial number associated with the valid certificate most recently assigned to the node assigned the revoked certificate.

30. An authentication node as claimed in claim 20, wherein the authentication node is configured to implement writing the indicator to more than one node.

31. One or more computer-readable storage memories, comprising stored instructions executable by one or more processors of an authentication node in a communication system comprising a plurality of nodes, the plurality of nodes being communicatively coupled to each other and to the authentication node, to implement operations comprising:

assigning a certificate to a node of the plurality of nodes, effective to enable authentication of the node to other nodes of the plurality of nodes;

compressing a data set representing validity of the certificates assigned to the plurality of nodes to form an update to distribute to the plurality of nodes, the update being such that the update may not unambiguously provide a determination that a particular certificate is valid;

periodically distributing the update to the plurality of nodes, effective to enable storing the update in the plurality of nodes;

generating a source of information about the validity of the plurality of certificates that is different from the update, effective to enable the node to resolve an ambiguity in the update regarding the validity of the particular certificate;

transmitting the source of information to one or more nodes of the plurality of nodes, effective to enable the source of information to be stored in the one or more nodes;

determining that a specific certificate should be revoked; and responsive to the determining, writing an indicator of the revocation of the specific certificate to one or more of the plurality of nodes as the source of information about the validity of the specific certificate.

* * * * *